(12) United States Patent
Murakami

(10) Patent No.: US 10,078,018 B2
(45) Date of Patent: Sep. 18, 2018

(54) TEMPERATURE DETECTION APPARATUS AND ROTATION ANGLE DETECTION APPARATUS

(71) Applicant: JTEKT CORPORATION, Osaka-shi, Osaka (JP)

(72) Inventor: Toshiaki Murakami, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 289 days.

(21) Appl. No.: 15/044,736

(22) Filed: Feb. 16, 2016

(65) Prior Publication Data

US 2016/0252403 A1 Sep. 1, 2016

(30) Foreign Application Priority Data

Feb. 27, 2015 (JP) ................................. 2015-038631

(51) Int. Cl.
*G01K 7/36* (2006.01)
*G01D 3/036* (2006.01)
(Continued)

(52) U.S. Cl.
CPC ............... *G01K 7/36* (2013.01); *G01D 3/036* (2013.01); *G01D 5/2053* (2013.01); *G01K 15/005* (2013.01)

(58) Field of Classification Search
CPC ....................................................... G01K 7/36
See application file for complete search history.

(56) References Cited

U.S. PATENT DOCUMENTS 6,552,666 B1 * 4/2003 Goto ........................ G01B 7/02
318/652
8,063,648 B2 * 11/2011 Nilsson .................... G01D 1/16
324/603
(Continued)

FOREIGN PATENT DOCUMENTS

DE       102007033881 A1    1/2009
EP          1508783 A1       2/2005
(Continued)

OTHER PUBLICATIONS

Jul. 8, 2016 Extended Search Report issued in European Patent Application No. 16156179.0.

*Primary Examiner* — Christopher Mahoney
*Assistant Examiner* — Leon W Rhodes, Jr.
(74) *Attorney, Agent, or Firm* — Oliff PLC

(57) ABSTRACT

A temperature detection apparatus and a rotation angle detection apparatus are provided that allow a temperature of a resolver to be calculated in real time. A rotation angle detection apparatus (10) (temperature detection apparatus) includes a resolver (20) with an excitation coil and output coils wound thereon, the excitation coil being subjected to an excitation voltage (VA) and the output coil outputting voltage signals (VB, VC) corresponding to the excitation voltage (VA), and a temperature calculation circuit (sensor microcomputer (32)) that detects a phase of the excitation voltage (VA) and that detects a phase of an excitation current (IA). The temperature calculation circuit (sensor microcomputer (32)) calculates a temperature of the resolver (20) based on a phase difference between the excitation voltage (VA) and the excitation current (IA).

8 Claims, 8 Drawing Sheets

(51) Int. Cl.
  *G01K 15/00*    (2006.01)
  *G01D 5/20*    (2006.01)

(56)       References Cited

U.S. PATENT DOCUMENTS

2007/0201171 A1*  8/2007  Kanekawa .......... H03M 1/1004
                                                    361/42
2015/0312970 A1* 10/2015  Tonomura .............. D21G 1/028
                                                    219/619
2017/0328788 A1* 11/2017  Coughlan ................. F02C 6/12

FOREIGN PATENT DOCUMENTS

EP            2639948 A1     9/2013
JP           11325813 A  *  11/1999
JP         2003-315162 A    11/2003
JP         2012-168041 A     9/2012

* cited by examiner

TEMPERATURE DETECTION APPARATUS AND ROTATION ANGLE DETECTION APPARATUS

INCORPORATION BY REFERENCE

The disclosure of Japanese Patent Application No. 2015-038631 filed on Feb. 27, 2015 including the specification, drawings and abstract, is incorporated herein by reference in its entirety.

BACKGROUND OF THE INVENTION

1. Field of the Invention

The invention relates to a temperature detection apparatus and a rotation angle detection apparatus.

2. Description of the Related Art

Resolvers have been known which output a voltage signal corresponding to a rotation angle of a rotor. Resolvers have detection accuracy that may vary depending on temperature, and often needs compensation based on the temperature. Thus, to detect the temperature of a resolver, the resolver itself may be used instead of a temperature sensor such as a thermistor. For example, as a method of using the resolver to detect the temperature thereof, a method described in Japanese Patent Application Publication No. 2003-315162 (JP 2003-315162A) is known. JP 2003-315162 A describes calculating a phase difference between phase signals resulting from sine approximation or cosine approximation based on voltage signals for the phases output from the resolver to calculate the temperature from the result of the calculation.

In the method in JP 2003-315162 A, the output values of the voltage signals for the phases output from the resolver are retrieved as plurality of times during one period, and sine approximation or cosine approximation is executed on the retrieved output values to obtain the phase signals. Thus, in the method of JP 2003-315162 A, the temperature is calculated which is based on the output values retrieved at least one period earlier. The method of JP 2003-315162 A may pose no problem depending on the application of the resolver. However, there has been a demand to calculate the temperature in real time, in other words, with substantially no delay.

SUMMARY OF THE INVENTION

An object of the invention is to provide a temperature detection apparatus and a rotation angle detection apparatus that allow the temperature of a resolver to be calculated in real time.

A temperature detection apparatus in an aspect of the invention includes:

a resolver with an excitation coil and an output coil wound thereon, the excitation coil being subjected to an excitation voltage and the output coil outputting a voltage signal corresponding to the excitation voltage, a voltage detection circuit that detects at least a phase of the excitation voltage;

a signal detection circuit that detects at least a phase of an electric signal correlated with the excitation voltage, and a temperature calculation circuit that calculates a temperature of the resolver based on a phase difference between the phase of the excitation voltage detected by the voltage detection circuit and the phase of the electric signal detected by the signal detection circuit.

In this configuration, when the excitation voltage is applied, not only the phase of the excitation voltage but also the phase of the electric signal correlated with the excitation voltage can be detected.

Of course, the temperature of the resolver needs to be calculated in a situation where the resolver outputs the voltage signal. As will be understood, in the situation where the voltage signal is output from the resolver, the excitation voltage is applied. Thus, in the situation where the resolver outputs the voltage signal, the phases of the excitation voltage and the electric signal can be detected in real time. Therefore, the temperature of the resolver can be calculated in real time from a phase difference between the excitation voltage and the electric signal.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
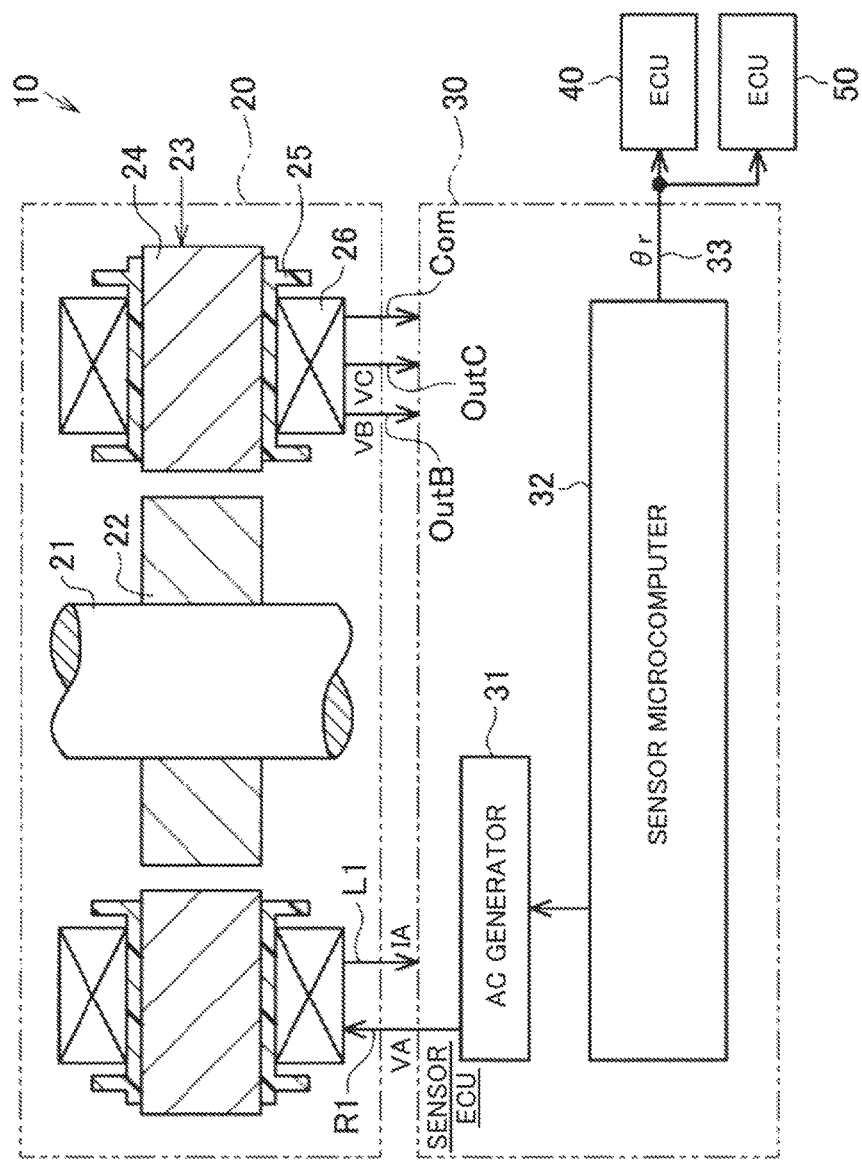
FIG. 1 is a front view depicting a rotation angle detection apparatus.

A first embodiment of a temperature detection apparatus and a rotation angle detection apparatus in the invention will be described. As depicted in FIG. 1, a rotation angle detection apparatus 10 is used, for example, as a motor rotation angle sensor that detects a rotation angle of a motor.

The rotation angle detection apparatus 10 includes a resolver 20 that uses, as a detection target, a rotating shaft 21 (rotor) of the motor provided so as to be rotatable around an axis m to output voltage signals for a sine waveform and a cosine waveform with amplitudes corresponding to a rotation angle of the rotating shaft 21. The rotation angle detection apparatus 10 also includes a sensor ECU 30 that applies an excitation voltage (excitation power) to the resolver 20 via an AC generator 31 such as an inverter. The sensor ECU 30 receives various outputs such as the voltage signal from the resolver 20 to perform calculation of the temperature of the resolver 20, calculation of the rotation angle of the rotating shaft 21, and the like. That is, the rotation angle detection apparatus 10 is also a temperature detection apparatus having a function to calculate the temperature of the resolver 20.

As depicted in FIG. 1, the resolver 20 includes a cylindrical rotor 22 fitted over an outer peripheral surface of the rotating shaft 21 and a ring-like stator 23 provided coaxially with the rotor 22. The rotor 22 is formed by stacking electromagnetic steel plates each having a predetermined number of salient pole portions on its outer periphery.

A plurality of T-shaped teeth 24 is provided on an inner periphery of the stator 23 at regular intervals in a circumferential direction so as to protrude toward the rotor 22. A resolver coil 26 is wound around each of the teeth 24 via an insulator 25. The resolver coil 26 is wound around each of the teeth 24 as a predetermined combination of an excitation coil 26a to which the excitation voltage VA is applied and output coils 26b and 26c for two phases in which voltages are induced based on an excitation current IA corresponding to the excitation voltage VA. The resolver 20 outputs voltage signals VB, VC different from each other in phase of amplitude change (in this case, the phases are 90° apart from each other) based on the volumes induced in the output coils 26b and 26c. That is, when the first voltage signal VB is output as a signal with a sine waveform, the second voltage signal VC with a phase 90° apart from the phase of the first voltage signal VB is output as a signal with a cosine waveform. The stator 23 is formed by stacking electromagnetic steel plates each having the teeth 24.

As depicted in FIG. 1, the sensor ECU 30 includes the AC generator 31 and a sensor microcomputer 32 including a microprocessing unit or the like. The sensor ECU 30 applies the excitation voltage VA to the resolver 20 via a plurality of signal lines R1, L1, OutB, OutC, and Com and receives the voltage signals VB, VC and the like from the resolver 20. The sensor ECU 30 (sensor microcomputer 32) also outputs the rotation angle θr of the rotating shaft 21 resulting from an internal calculation to other ECUs 40, 50 and the like via a signal line 33 such as CAN. The other ECUs 40, 50, for example, control the rotation angle of the motor and perform control using the rotation angle θr of the motor.

Figure 2:
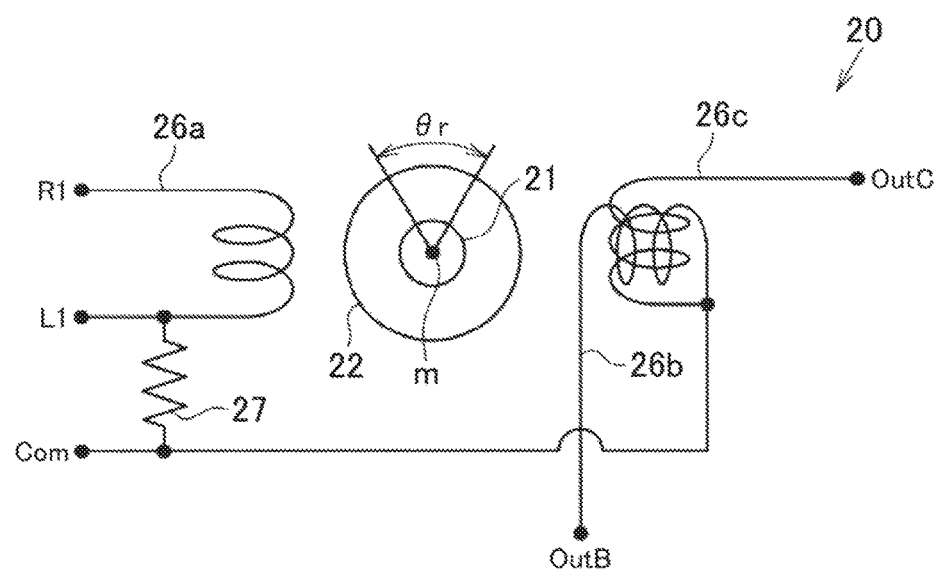
FIG. 2 is a diagram schematically depicting a configuration of a resolver in a rotation angle detection apparatus in a first embodiment.

Now, a configuration of the resolver 20 will be described. As depicted in FIG. 2, the resolver coil 26 is electrically connected to the sensor ECU 30 via the signal lines R1, L1, OutB, OutC, and Com. One end of the excitation coil 26a is connected to the sensor ECU 30 such that the excitation voltage VA can be applied to the excitation coil 26a via the signal line R1.

One end of the output coil 26b arranged orthogonally to the excitation coil 26a is connected to the sensor ECU 30 so as to enable output of the voltage signal VB to the sensor ECU 30 via the signal line OutB. The output coil 26b outputs a sensor signal with a sine waveform with an amplitude corresponding to the rotation angle θ of the rotating shaft 21 (rotor 22) based on a portional relationship between the output coil 26b and the excitation coil 26a.

One end of the output coil 26b arranged parallel to the excitation coil 26a is connected to the sensor ECU 30 so as to enable output of the voltage signal VC to the sensor ECU 30 via the signal line OutC. The output coil 26c outputs a sensor signal with a cosine waveform with an amplitude corresponding to the rotation angle θ of the rotating shaft 21 (rotor 22) based on a positional relationship between the output coil 26c and the excitation coil 26a.

The other ends of the resolver coil 26 (26a, 26b, and 26c) that are not connected to the signal line R1, OutB, or OutC are connected to the sensor ECU 30 via the signal line Com. The resolver coil 26 is short-circuited via the signal line Com.

In the excitation coil 26a, a shunt resistor 27 is connected between the signal lines R1 and Com to enable an excitation current conducted through the excitation coil 26a to be shunted and detected. One end of the shunt resistor 27 is connected via the signal line L1 to the sensor ECU 30 so as to enable output, to the sensor ECU 30, of a voltage proportional to an excitation current IA. The other end of the shunt resistor 27 is short-circuited by being connected to the sensor ECU 30 via the signal line Com.

Figure 3:
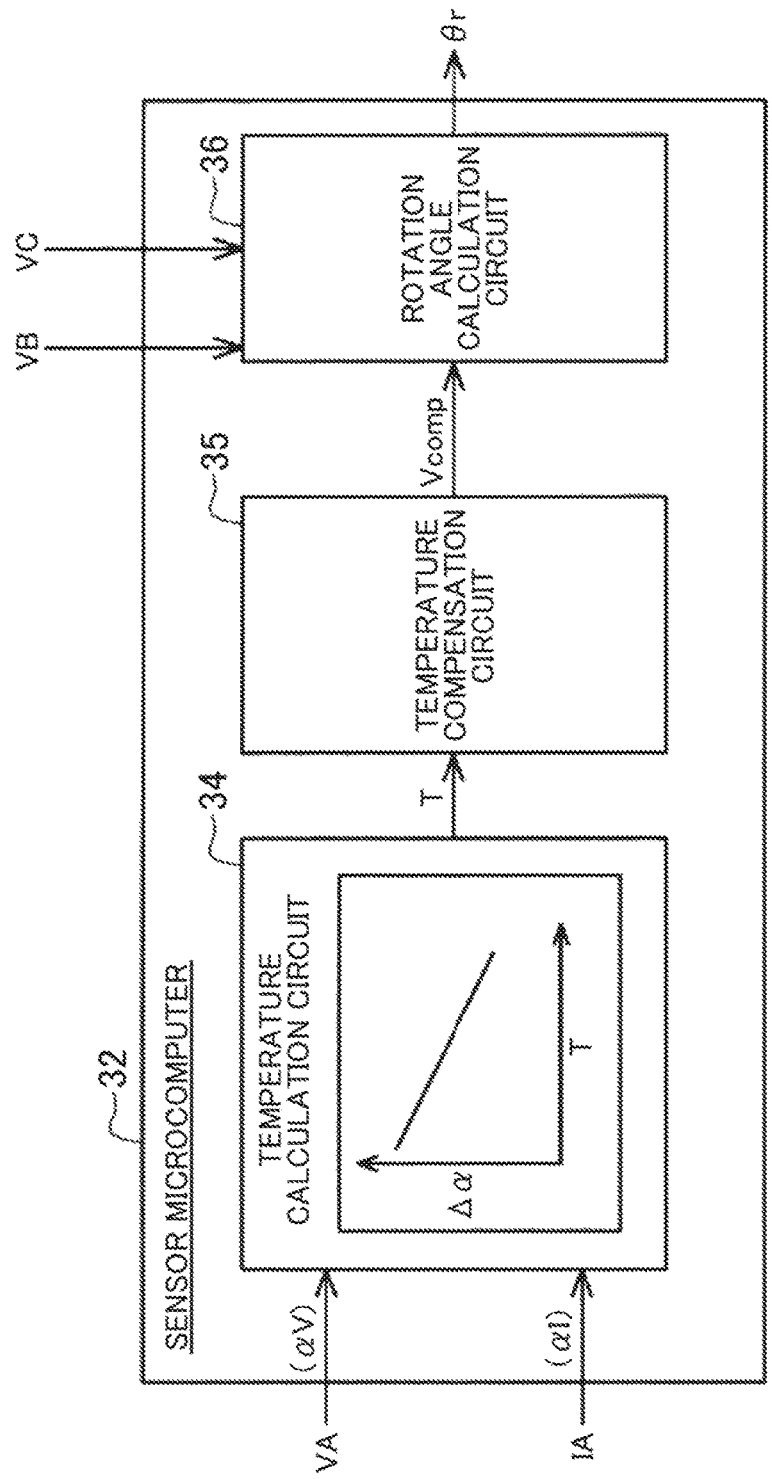
FIG. 3 is a diagram depicting a configuration of a control apparatus configured of a sensor microcomputer in the rotation angle detection apparatus in the first embodiment.

Now, functions of the sensor microcomputer 32 of the sensor ECU 30 will be described in detail. As depicted in FIG. 3, the sensor microcomputer 32 has a temperature calculation circuit 34 that monitors the waveform of the excitation voltage VA applied to the resolver 20 and the waveform of the excitation current IA conducted through the resolver 20 via the shunt resistor 27 in the excitation coil 26a of the resolver 20 to calculate the temperature of the resolver 20 based on a phase difference Δα between the waveforms. The sensor microcomputer 32 (temperature calculation circuit 34) serves as an excitation voltage detection circuit that detects the phase of the waveform of the excitation voltage VA and a signal detection circuit that detects the phase of the waveform of the excitation current IA. In particular, the resolver 20 and the temperature calculation circuit 34 in the sensor microcomputer 32 (sensor ECU 30) form the temperature detection apparatus.

The sensor microcomputer 32 also has a temperature compensation circuit 35 that calculates a temperature compensation amount Vcomp for calculation of the rotation angle θr of the rotating shaft 21 based on the temperature of the resolver 20 calculated by the temperature calculation circuit 34. The sensor microcomputer 32 has a rotation angle calculation circuit 36 that calculates the rotation angle θr of the rotating shaft 21 based on the voltage signals VB, VC output from the resolver 20.

For the resolver, winding resistance (impedance) of the excitation coil and the like is known to fluctuate in accordance with temperature. This can be explained based on the dependence, on temperature, of so-called self-inductance, capacitance, and the like related to the winding resistance. That is, a fluctuation in winding resistance depending on temperature has been found to produce an adverse effect such as a decrease in detection accuracy for the rotation angle θr in the resolver 20. Specifically, the resolver 20 is subjected to a phenomenon where offset values (crest values) of the voltage signals VB, VC fluctuate in accordance with a fluctuation in the temperature (winding resistance) of the resolver 20 (or a periphery thereof). In other words, the resolver 20 is subjected to a temperature drift. The fluctuation in crest value may result in an accuracy error in the resolver 20 to affect the detection accuracy for the rotation angle θr.

Thus, the temperature calculation circuit 34, the temperature compensation circuit 35, and the rotation angle calculation circuit 36 (sensor microcomputer 32) detect the temperature of the resolver 20 while compensating for the adverse effect of the temperature drifts of the voltage signals VB, VC. To compensate for the adverse effect of the temperature drift, the temperature of the resolver needs to be detected. Therefore, the temperature calculation circuit 34, the temperature compensation circuit 35, and the rotation angle calculation circuit 36 (sensor microcomputer 32) have the following functions.

As depicted in FIG. 3, the temperature calculation circuit 34 receives the excitation voltage VA applied to the excitation coil 26a through the AC generator 31 and the excitation current IA conducted through the excitation coil 26a simultaneously with the application (to be exact, a voltage proportional to the excitation current IA at the shunt resistor 27). The excitation voltage VA is received directly from the AC generator 31 through the interior of the sensor ECU 30. The received excitation current IA may be subjected to a phase difference with respect to the excitation voltage VA under the effect of the temperature of the resolver 20.

The temperature calculation circuit 34 detects a phase αV of the received excitation voltage VA and also detects a phase αI of received excitation current IA. The temperature calculation circuit 34 calculates (detects) the phase difference Δα between the excitation voltage VA and the excitation current IA based on the phase αV and the phase αI.

Figure 4:
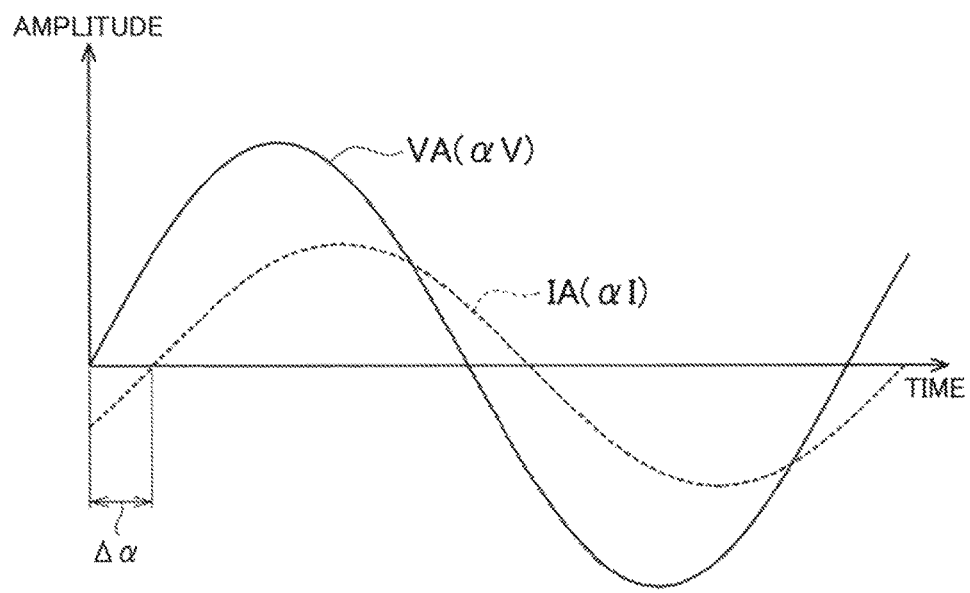
FIG. 4 is a diagram illustrating a relationship between the phases of an excitation voltage and an excitation current in the first embodiment.

That is, the excitation voltage VA (in FIG. 4, a continuous line) with a phase αV and the excitation current IA (in FIG. 4, a dashed line) are detected, for example, as depicted in FIG. 4. A crest value for the excitation current IA depends on a crest value for the excitation voltage VA and the impedance of the resolver. The excitation current IA has a phase αI involving a phase difference Δα with respect to the phase of the excitation voltage VA.

The phase difference between the excitation voltage and the excitation current is also known to be obtained based on self-inductance or capacitance (the phase difference is correlated with the self-inductance or capacitance). Focusing on the point that the phase difference Δα determined by the self-inductance, the capacitance, or the like fluctuates depending on a temperature T, the inventor has found that allowing the phase difference Δα to be calculated enables the temperature T of the resolver 20 to be calculated.

Figure 5A:
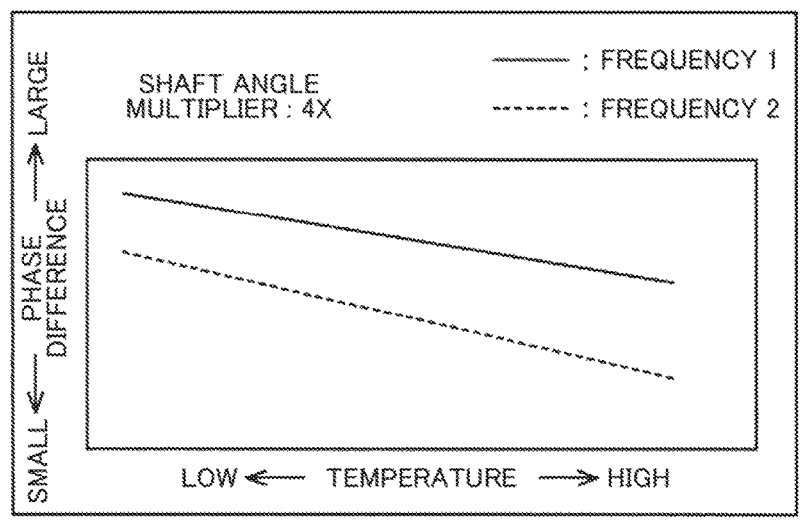
FIG. 5A is a diagram illustrating verification results for a temperature of the resolver and a phase difference between the excitation voltage and the excitation current in the case of a shaft angle multiplier 4×.
Figure 5B:
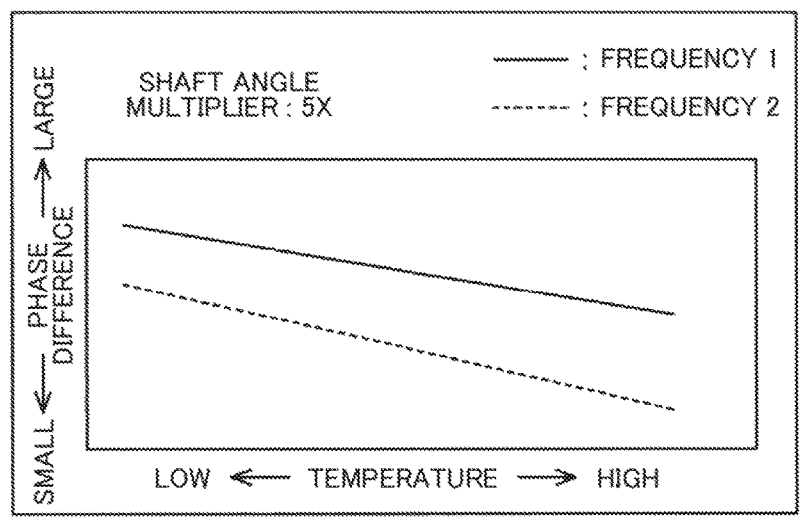
FIG. 5B is a diagram illustrating verification results for the temperature of the resolver and the phase difference between the excitation voltage and the excitation current in the case of a shaft angle multiplier 5×.

Thus, as illustrated in an example in FIG. 5A and FIG. 5B, the inventor conducted verification experiments on the relationship between the temperature of the resolver and the phase difference between the excitation voltage actually applied to the excitation coil and the excitation current based on the excitation voltage. For example, FIG. 5A illustrates the results of verification in which a shaft angle multiplier 4 (4×) was used and in which AC power with different frequencies, a frequency 1 and a frequency 2, was supplied. FIG. 5B illustrates the results of verification in which a shaft angle multiplier 5 (5×) was used and in which AC power with different frequencies, a frequency 1 and a frequency 2, was also supplied. A shaft angle multiplier N is the number which represents the output signal of the resolver varies N cycles while the rotating shaft 21 rotates one revolution. The verification results indicate a relationship in which the temperature of the resolver decreases with an increase in phase difference between the excitation voltage and the excitation current, and increases with a decrease in phase difference between the excitation voltaic and the excitation current.

As is apparent from the verification results, with any combination of the resolver specifications such as the shaft angle multiplier and the frequencies of the supplied AC power, a linear (constant) relationship is present between the temperature of the excitation coil (resolver) and the phase difference between the excitation voltage and the excitation current. The inventor repeatedly conducted verification to create a map that represents phase difference characteristics for each combination of the resolver specification and the frequency of the applied AC power.

That is, the temperature calculation circuit 34 internally has a map that indicates the phase difference characteristics in association with the specification for the resolver 20. The map may be a three-dimensional map having a map for each frequency of the applied AC power or a particular map in association with the frequency of the AC power to be applied.

In accordance with the phase difference Δα calculated from the excitation voltage VA and the excitation current IA in the resolver 20, the temperature calculation circuit 34 calculates the temperature T of the resolver 20 using the map indicative of the phase difference characteristics and outputs the temperature T to the temperature compensation circuit 35.

In accordance with the temperature T output from the temperature calculation circuit 34, the temperature compensation circuit 35 calculates the temperature compensation amount Vcomp using the map indicative of temperature compensation characteristics and outputs the temperature compensation amount Vcomp to the rotation angle calculation circuit 36. The temperature compensation circuit 35 internally has a map indicative of the temperature compensation characteristics in association with the specifications for the resolver 20. For the temperature compensation characteristics, the map indicates a change characteristic of the crest value in accordance with the temperature T of the resolver 20 for each of the voltage signals VB, VC output from the output coils 26b, 26c. The map may be a three-dimensional map having a map for each frequency of the applied AC power or a particular map in association with the frequency of the AC power to be applied.

The rotation angle calculation circuit 36 receives the voltage signals VB, VC through the resolver 20 and also receives the temperature compensation amount Vcomp output from the temperature compensation circuit 35. The rotation angle calculation circuit 36 performs temperature compensation an the voltage signals VB, VC by taking the temperature compensation amount Vcomp into account for (adding or subtracting the temperature compensation amount Vcomp to or from) the voltage signals VB, VC received through the resolver 20. The rotation angle calculation circuit 36 calculates the rotation angle θr of the rotating shaft 21 from the voltage signals VB, VC resulting from the compensation. The rotation angle calculation circuit 36 then outputs the rotation angle θr to the other ECUs 40 and 50 and the like.

In the first embodiment, the electric signal correlated with the excitation voltage is the excitation current, the signal detection circuit detects at least the phase of the excitation current shunted from the excitation coil via the shunt resistor, and the temperature calculation circuit calculates the temperature of the resolver based on the phase difference between the excitation voltage and the excitation current.

The above-described rotation angle detection apparatus 10, which also serves as the temperature detection apparatus, can produce effects described below in (1) to (5). (1) The sensor microcomputer 32 in the rotation angle detection apparatus 10, to which the excitation voltage VA is applied, can not only detect the phase αV of the excitation voltage VA but can also detect the phase αI of the excitation current IA correlated with the excitation voltage VA. That is, the phase αI of the excitation current IA is detected even while the rotating shaft 21 is not in rotation as long as the excitation voltage VA is applied to the rotation angle detection apparatus 10.

Of course, the temperature T of the resolver 20 needs to be calculated in a situation where the resolver 20 outputs the voltage signals VB, VC. As will be understood, in the situation where the voltage signals VB, VC are output from the resolver 20, the excitation voltage VA is applied. Thus, in the situation where the resolver 20 outputs the voltage signals VB, VC, the phases of the excitation voltage VA and the excitation current IA can be calculated in real time. Therefore, the temperature T of the resolver 20 can be calculated in real time from the phase difference Δα between the excitation voltage VA and the excitation current IA.

(2) When calculating the rotation angle of the rotating shaft 21 based on the voltage signals VB, VC output from the resolver 20, the rotation angle detection apparatus 10 performs temperature compensation on the voltage signals VB, VC based on the temperature T of the resolver 20.

The rotation angle detection apparatus 10 enables the temperature T of the resolver 20 calculated in real time to be used for the temperature compensation for the rotation angle θr calculated by the rotation angle calculation circuit 36, thus allowing the temperature compensation to be performed in real time. Therefore, the accuracy of the rotation angle θr calculated by the rotation angle calculation circuit 36 can be enhanced.

(3) In the above-described temperature compensation, an accuracy error in the resolver 20 is compensated for which error is based on fluctuations in the crest values of the voltage signals VB, VC output from the resolver 20. When the fluctuation in crest value depending on the fluctuation in the temperature T of the resolver 20 is compensated for, even with a fluctuation in the temperature T of the resolver 20, the accuracy error resulting from the fluctuation can be reduced. In this manner, the factor that affects the detection accuracy for the rotation angle θr in the resolver 20 can also be dealt with in real time.

(4) The resolver 20 may have an accuracy error occurring during manufacturing. Thus, the rotation angle detection apparatus 10 enables the temperature compensation to be achieved by calculating the phase difference Δα at normal temperature, comparing the phase difference Δα with the prepared map indicative of the phase difference characteristics, and preliminarily offsetting the error between the phase difference and the map. Consequently, even if an accuracy error occurring during manufacture of the resolver 20 leads to a variation in the relationship between the temperature T and the phase difference Δα in the map indicative of the phase difference characteristics, such a variation can be corrected.

(5) The temperature T of the resolver 20 can be calculated as long as at least the phase difference Δα between the excitation voltage VA and the excitation current IA can be detected. Thus, for example, any configuration may be used to detect the excitation current IA as long as at least the phase at of the excitation current IA can be detected. When the shunt resistor 27 is used, the need to make the accuracy of the magnitude (crest value) of the excitation current IA as high as possible is also eliminated. Therefore, the configuration that detects the excitation current IA can be implemented as simply and inexpensively as possible.

Now, a second embodiment of the temperature detection apparatus and the rotation angle detection apparatus in the invention will be described. Configurations and contents of control in the second embodiment that are the same as those in the above-described embodiment are denoted by the same reference numerals and will not be redundantly described.

Figure 6:
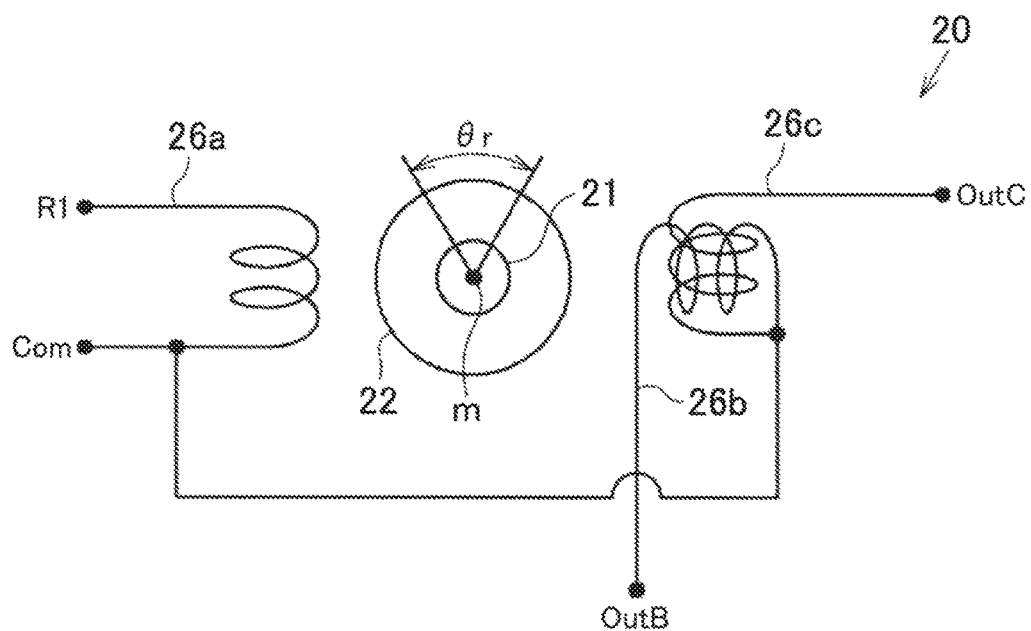
FIG. 6 is a diagram schematically depicting a configuration of a resolver in a rotation angle detection apparatus in a second embodiment.
Figure 7:
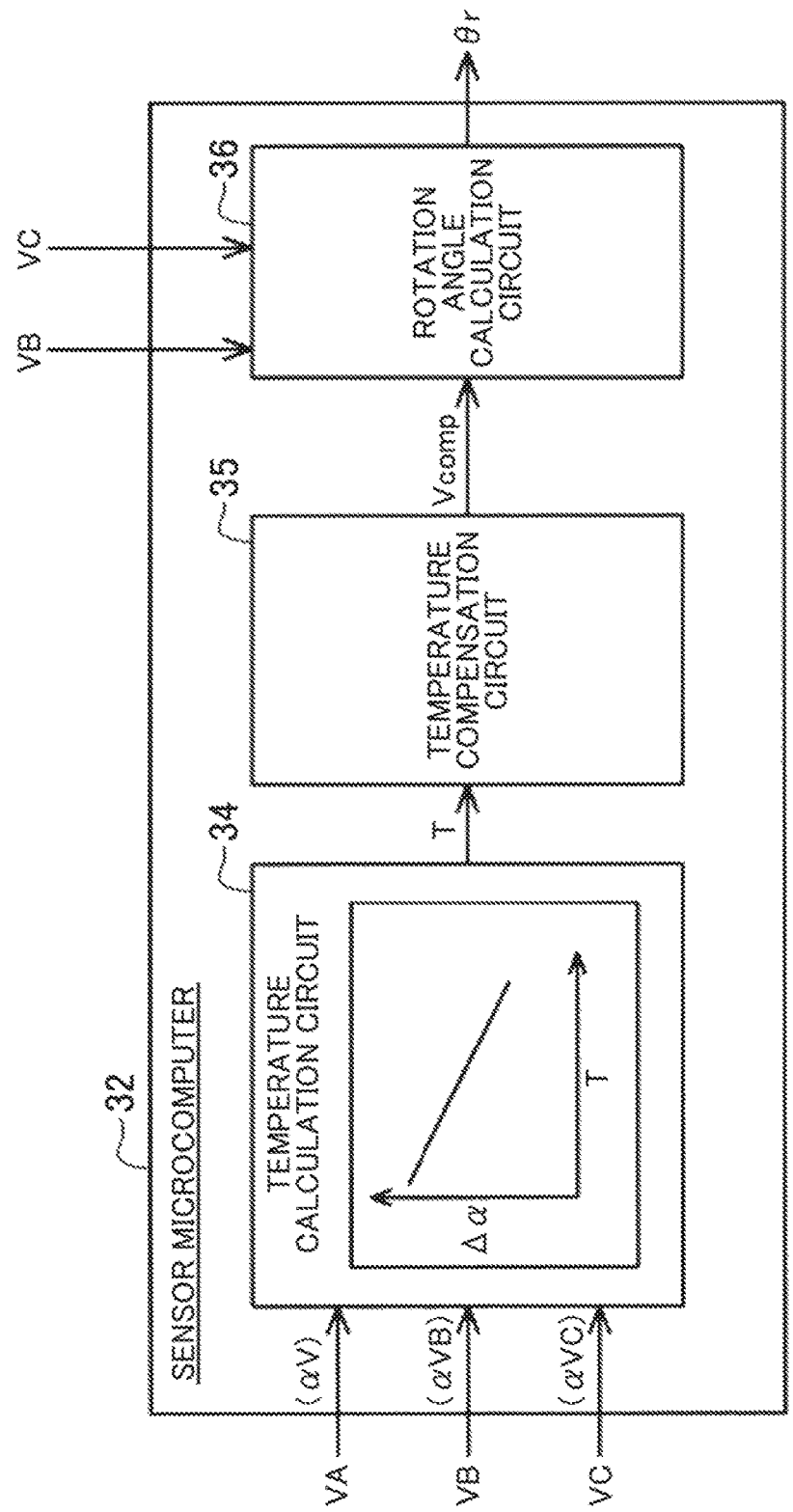
FIG. 7 is a diagram depicting a configuration of a control apparatus configured of a sensor microcomputer in the rotation angle detection apparatus in the second embodiment.

As depicted in FIG. 6, the resolver coil 26 in the present embodiment is electrically connected to the sensor ECU 30 via the signal lines R1, OutB, OutC, and Com. As depicted in FIG. 7, the temperature calculation circuit 34 in the sensor microcomputer 32 monitors the waveform of the excitation voltage VA applied to the resolver 20 and the waveforms of the voltage signals VB, VC output from the resolver 20 to calculate the temperature of the resolver 20 based on the phase difference Δα between the waveforms.

The phase difference Δα is calculated (detected) by using a phase comparator or the like. Alternatively, a microprocessing unit that can perform processing at a relatively high speed to achieve a relatively high resolution during a relatively short sampling period is used to monitor the waveforms of the voltage signals VB, VC and calculate (detect) the phase difference Δα. The sensor microcomputer 32 (temperature calculation circuit 34) serves as a signal detection circuit that detects the phases of the waveforms of the voltage signals VB, VC.

Figure 8:
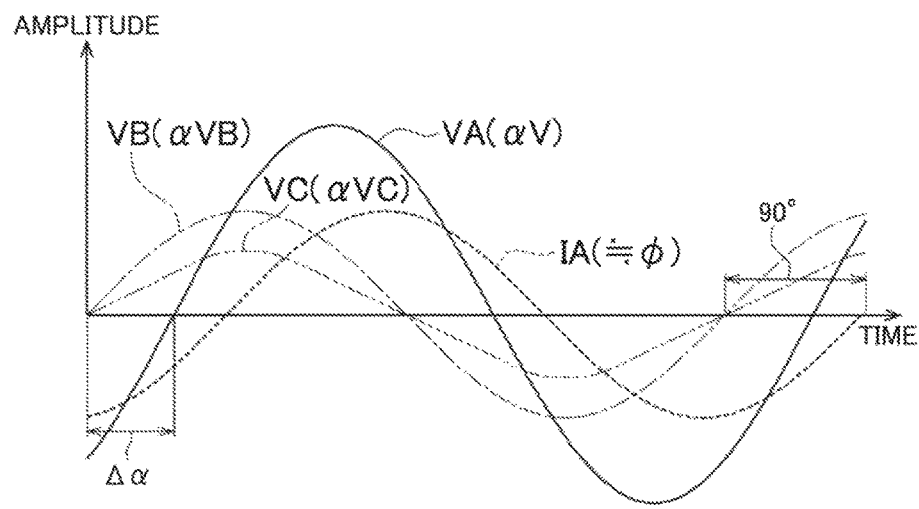
FIG. 8 is a diagram illustrating a relationship between the phases of an excitation voltage, an excitation current and voltage signals in the second embodiment.

That is, for example, as depicted in FIG. 8, when the excitation voltage VA with the phase αV (in FIG. 8, a continuous line) is detected, the voltage signal VB (in FIG. 8, a long dashed short dashed line) and the voltage signal VC (in FIG. 8, a long dashed double-short dashed line) having respective crest values corresponding to electrical angles to the rotating shaft 21. The voltage signal VB has a phase αVB involving a phase difference Δα with respect to the phase of the excitation voltage VA. The voltage signal VC has a phase αVC (the same phase as of αVB) involving a phase difference Δα with respect to the phase of the excitation voltage VA. For convenience of description, the waveforms for one period at particular crest values are illustrated as the voltage signals VB, VC. However, while the electrical angle to the rotating shaft 21 changes on a moment-to-moment basis, the crest value also changes on a moment-to-moment basis.

The excitation current IA generated in the excitation coil 26a in the resolver 20 is known to be approximately equal to magnetic fluxes Φ generated in the output coils 26b and 26c. That is, the voltages induced in the output coils (voltage signals VB, VC) are obtained by differentiating the excitation current IA generated in the excitation coil 26a in the resolver 20. Thus, the inventor focused on a given relationship between the excitation current IA and the voltage signals VB, VC (the phases αVB, αVC of the voltage signals VB, VC lead 90° ahead of the phase αI of the excitation current IA). This supports the correlation of the voltage signals, VB VC with the excitation voltage VA. Thus, the inventor has found that, when the phase difference Δα between the excitation voltage VA and the voltage signals VB, VC can be calculated, the temperature T of the resolver 20 can be calculated from the phase difference Δα. The inventor's finding is based on the premise that the inventor focused on the phase difference between the excitation voltage VA and the excitation current IA, which fluctuates depending on the temperature T of the resolver 20, as described above in the first embodiment.

That is, the temperature calculation circuit 34 internally has a map indicative of excitation voltage-voltage signal phase difference characteristics corresponding to the map indicative of the phase difference characteristics in the first embodiment. The excitation voltage-voltage signal phase difference Δα in the map is equivalent to the phase difference Δα in the case where the phase of the excitation current IA is led 90° ahead in the first embodiment. As is the case with the first embodiment, the map may be a three-dimensional map having a map for each frequency of the applied AC power or a particular map in association with the frequency of the AC power to be applied.

In accordance with the phase difference $\Delta\alpha$ calculated from the excitation voltage VA and the voltage signals VB, VC in the resolver 20, the temperature calculation circuit 34 calculates the temperature T of the resolver 20 using the map indicative of excitation voltage-voltage signal phase difference characteristics, and outputs the temperature T to the temperature compensation circuit 35.

As the phase difference $\Delta\alpha$ calculated from the excitation voltage VA and the voltage signals VB, VC in the resolver 20, the temperature calculation circuit 34 basically uses the phase $\alpha$VB of the voltage signal VB for calculation. However, while the electrical angle to the rotating shaft 21 changes on a moment-to-moment basis, the crest value of the voltage signal VB also changes on a moment-to-moment basis.

Figure 9:
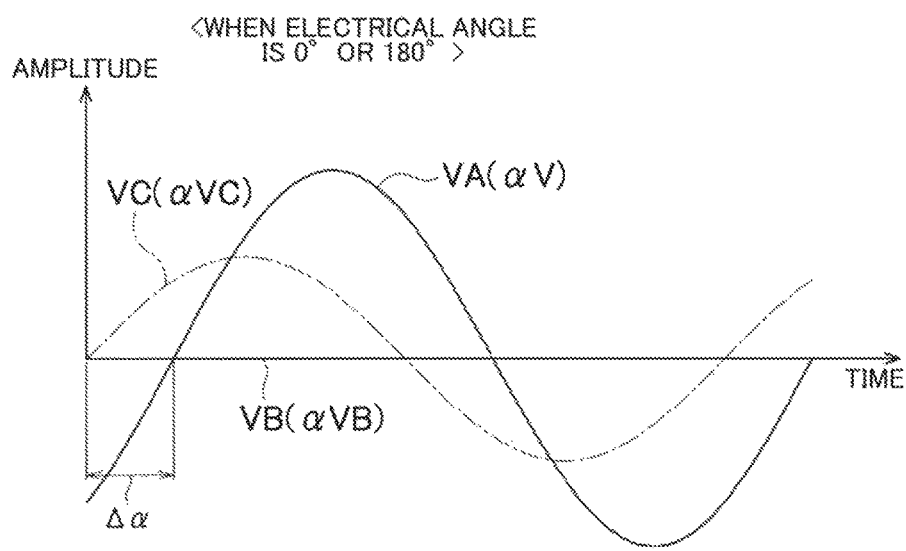
FIG. 9 is a diagram illustrating a relationship between the phases of the excitation voltage and the voltage signals in the second embodiment.

Thus, as depicted in FIG. 9, the voltage signal VB has a crest value of 0 (zero) particularly when the electrical angle to the rotating shaft 21 is 0° (zero) or 180°. In contrast, the voltage signal VC is different from the voltage signal VB in phase of amplitude change, and has a crest value other than 0 (zero) even when the electrical angle to the rotating shaft 21 is 0 (zero) or 180°.

Thus, in a particular situation where the voltage signal VB has a crest value of 0 (zero), the temperature calculation circuit 34 calculates the phase difference $\Delta\alpha$ using the phase $\alpha$VC of the voltage signal VC instead of the voltage signal VB. Consequently, the temperature calculation circuit 34 can calculate the phase difference $\Delta\alpha$ for calculating the temperature T of the resolver 20, regardless of the electrical angle to the rotating shaft 21.

Thus, in accordance with the phase difference $\Delta\alpha$ calculated from the excitation voltage VA and the voltage signals VB, VC in the resolver 20, the temperature calculation circuit 34 calculates the temperature T of the resolver 20 using the map indicative of excitation voltage-voltage signal phase difference characteristics, and outputs the temperature T to the temperature compensation circuit 35. Subsequently, in accordance with the temperature T output from the temperature calculation circuit 34, the temperature compensation circuit 35 calculates the temperature compensation amount Vcomp using the map indicative of the temperature compensation characteristics. The rotation angle calculation circuit 36 calculates the rotation angle θr of the rotating shaft 21 with the temperature compensation amount Vcomp taken into account for (added to or subtracted from) the voltage signals VB, VC received through the resolver 20, and outputs the rotation angle θr to the other ECUs 40, 50 and the like.

In the second embodiment, the electric signal correlated with the excitation voltage is the voltage signal output from the resolver, the signal detection circuit detects at least the phase of the voltage signal output from the resolver, and the temperature calculation circuit calculates the temperature of the resolver based on the phase difference between the excitation voltage and the voltage signal output from the resolver.

The above-described rotation angle detection apparatus 10, which also serves as the temperature detection apparatus, produces effects described below in (6) and (7), in addition to the effects of the first embodiment described in (1) to (4).

(6) When the voltage signals VB, VC are used to calculate the phase difference $\Delta\alpha$, as long as the voltage signals VB, VC output from the resolver 20 can be retrieved, the resolver 20 need not be provided with an additional component such as a shunt resistor. Therefore, the configuration that calculates the temperature T of the resolver 20 can be implemented more simply and inexpensively.

(7) When two outputs, namely, the voltage signals VB, VC, are used to calculate the phase difference $\Delta\alpha$, the second voltage signal has a crest value other than 0 (zero) even if the first voltage signal has a crest value of 0 (zero) (undetectable). Thus, in principle, even when the phase $\alpha$VB of the voltage signal VB is used to calculate the phase difference $\Delta\alpha$, the phase difference $\Delta\alpha$ and further the temperature T of the resolver 20 can be calculated.

The above-described embodiments may be implemented in different manners described below. The temperature calculation circuit 34 is preliminarily internally provided with an arithmetic expression for calculating the temperature T of the resolver 20 based on the phase difference $\Delta\alpha$ so that the temperature T can be calculated using the arithmetic expression.

The above-described embodiments allow the temperature T of the resolver 20 to be calculated in real time. Thus, the embodiments are applicable to temperature compensation for a factor that may affect the detection accuracy for the rotation angle θr in the resolver 20, besides the temperature compensation for the crest values the voltage signals VB, VC, which may fluctuate depending on a fluctuation in the temperature T of the resolver 20.

The above-described embodiments may be implemented, for example, as temperature detection apparatuses (temperature sensors) that detect the temperature of the motor, by installing the resolver 20 in the vicinity of the motor. In this case, at least the temperature calculation circuit 34 may be provided, which is included in the sensor microcomputer 32 (sensor ECU 30). The temperature of the motor thus detected by the resolver 20 is used to control the rotation angle of the motor.

In the first embodiment, a current sensor including a Hall IC may be adopted to detect the phase $\alpha$I of the excitation current IA. In this case, the excitation current IA can be detected in a non-contact manner. Therefore, it is possible to increase the degree of freedom in the layout of components of the resolver 20.

In the second embodiment, a switching pattern for the voltage signals VB, VC used to calculate the phase difference $\Delta\alpha$ may be changed. For example, the crest values of the voltage signals VB and VC may be compared with each other so that a phase of the voltage signal with the larger crest value can be used to calculate the phase difference $\Delta\alpha$. Consequently, regardless of, for example, which of the voltage signals VB and VC is 0 (zero), the phase difference $\Delta\alpha$ and further the temperature T of the resolver 20 can be calculated.

In the second embodiment, if the temperature compensation is omitted in the situation where the voltage signals VB, VC have a crest value of 0 (zero), the resolver 20 may be configured to provide only one output. The resolver 20 may be provided with a voltage sensor that detects the phase $\alpha$VA of the excitation voltage VA. In this case, the resolver 20 can internally complete detection of information necessary to calculate the phase difference $\Delta\alpha$ in the above-described embodiments, that is, detection of the excitation voltage VA, the excitation current IA, and the voltage signals VB, VC. Thus, for installation of the rotation angle detection apparatus 10, even if, for example, the resolver 20 needs to be located away from the sensor ECU 30 due to specifications of an installation target, information for calculating the temperature T of the resolver 20 to be calculated can be collected near the resolver 20 for which the temperature T is to be detected. This enables a reduction in variation resulting from a difference in location between the resolver 20 and the sensor ECU 30.

In the above-described embodiments, the voltage signal output from the resolver may be redundant. For example, in order to make the voltage signal VB redundant, one input needs to be added for redundancy of the voltage signal VB or a voltage signal VC that is different from the voltage signal VB in phase of amplitude change needs to be provided. In this case, three outputs are needed as outputs of the resolver 20. Taking the above into account, any configuration may be used as long as the resolver 20 has two outputs or more.

In the above-described embodiments, two resolvers 20 may be provided to implement a torque sensor.

What is claimed is:

1. A temperature detection apparatus for a resolver comprising:
    a resolver with an excitation coil and an output coil wound thereon, the excitation coil being subjected to an excitation voltage and the output coil outputting a voltage signal corresponding to the excitation voltage,
    a voltage detection circuit that detects at least a phase of the excitation voltage;
    a signal detection circuit that detects at least a phase of an electric signal correlated with the excitation voltage, and
    a temperature calculation circuit that calculates a temperature of the resolver based on a phase difference between the phase of the excitation voltage detected by the voltage detection circuit and the phase of the electric signal detected by the signal detection circuit;
    wherein the electric signal correlated with the excitation voltage is an excitation current.

2. A rotation angle detection apparatus comprising:
    the temperature detection apparatus for a resolver according to claim 1;
    a rotation angle calculation circuit that calculates a rotation angle of a rotor that is a detection target based on the voltage signal output from the output coil of the resolver, and
    a temperature compensation circuit that performs temperature compensation on the rotation angle calculated by the rotation angle calculation circuit based on the temperature calculated by the temperature calculation circuit.

3. The rotation angle detection apparatus according to claim 2, wherein
    the temperature compensation circuit uses the temperature calculated by the temperature calculation circuit to compensate for an accuracy error in the rotation angle calculated by the rotation angle calculation circuit, the accuracy error depending on a temperature.

4. The rotation angle detection apparatus according to claim 2, wherein
    the signal detection circuit detects at least a phase of the excitation current shunted from the excitation coil via a shunt resistor, and
    the temperature calculation circuit calculates the temperature of the resolver based on a phase difference between the excitation voltage and the excitation current.

5. The temperature detection apparatus according to claim 1, wherein the temperature calculation circuit is configured to calculate the temperature of the resolver to obtain a temperature value that can be expressed on a temperature scale including Fahrenheit or Celcius.

6. A temperature detection apparatus for a resolver comprising:
    a resolver with an excitation coil and an output coil wound thereon, the excitation coil being subjected to an excitation voltage and the output coil outputting a voltage signal corresponding to the excitation voltage,
    a voltage detection circuit that detects at least a phase of the excitation voltage;
    a signal detection circuit that detects at least a phase of an electric signal correlated with the excitation voltage,
    a temperature calculation circuit that calculates a temperature of the resolver based on a phase difference between the phase of the excitation voltage detected by the voltage detection circuit and the phase of the electric signal detected by the signal detection circuit,
    a rotation angle calculation circuit that calculates a rotation angle of a rotor that is a detection target based on the voltage signal output from the output coil of the resolver, and
    a temperature compensation circuit that performs temperature compensation on the rotation angle calculated by the rotation angle calculation circuit based on the temperature calculated by the temperature calculation circuit;
    wherein the electric signal correlated with the excitation voltage is an excitation current.

7. The temperature detection apparatus according to claim 6, wherein
    the temperature compensation circuit uses the temperature calculated by the temperature calculation circuit to compensate for an accuracy error in the rotation angle calculated by the rotation angle calculation circuit, the accuracy error depending on a temperature.

8. The temperature detection apparatus according to claim 6, wherein
    the signal detection circuit detects at least a phase of the excitation current shunted from the excitation coil via a shunt resistor, and
    the temperature calculation circuit calculates the temperature of the resolver based on a phase difference between the excitation voltage and the excitation current.

* * * * *